United States Patent [19]
Van Alstyne

[11] Patent Number: 5,751,897
[45] Date of Patent: May 12, 1998

[54] SYSTEM FOR PHOTOPYROLITICALLY REMOVING A CONTAMINANT

[76] Inventor: David C. Van Alstyne, 2664 California St., Apt. No. 5, San Francisco, Calif. 94115

[21] Appl. No.: 748,185

[22] Filed: Nov. 12, 1996

Related U.S. Application Data

[62] Division of Ser. No. 378,944, Jan. 26, 1995, which is a continuation of Ser. No. 67,521, May 25, 1993, abandoned.

[51] Int. Cl.$^6$ .................................................. F21V 7/12
[52] U.S. Cl. .......................... 392/419; 392/417; 392/424
[58] Field of Search ................................ 392/415, 424, 392/418, 419, 417; 134/56 R, 1, 19, 201; 15/320; 252/186.28, 186.29, 186.43; 510/175

[56] References Cited

U.S. PATENT DOCUMENTS

| | | | |
|---|---|---|---|
| 4,867,796 | 9/1989 | Asmus et al. | 134/1 |
| 5,024,968 | 6/1991 | Engelsberg | 437/173 |
| 5,068,040 | 11/1991 | Jackson | 210/748 |
| 5,147,125 | 9/1992 | Austin | 359/359 |
| 5,151,135 | 9/1992 | Magee | 134/1 |
| 5,328,517 | 7/1994 | Cates | 134/1 X |

*Primary Examiner*—Tu B. Hoang
*Attorney, Agent, or Firm*—Walter H. Dreger; Michael A. Kautman

[57] ABSTRACT

A system for safely removing even a hazardous contaminant from a substrate surface includes a light energy source whose output is controlled to selectively provide components primarily in the visible and infrared spectrum, and a power unit for energizing the light energy source at a desired energy level, pulse width and pulse repetition rate. Proper selection of these parameters permits the energy source to heat the contaminant sufficiently to cause direct carbonization without entering a melt phase, without the need for any precoat medium. Because the resultant molecular decomposition of the contaminant occurs relatively faster than heat transfer to the underlying substrate, substantially no substrate heating results. The light source energy transforms the contaminant to an ash that is removed from the substrate by a vacuum system preferably surrounding the light source. The light source is preferably a xenon flash lamp operated with a pulse repetition rate of between about 0.1 pulses/second and 12 pulses/second, an energy pulse duration of about 400 μs to about 800 μs, and a peak energy per pulse exceeding about 3,750 joule. The system also provides a mechanism for selectively emphasizing either the visible light or the infrared light spectrum output from the light energy source, to further customize the energy output to the contaminant being removed. A robotic mechanism preferably moves the light energy source over the substrate in applications where a long dwell time is desired to vitrify a contaminant.

15 Claims, 5 Drawing Sheets

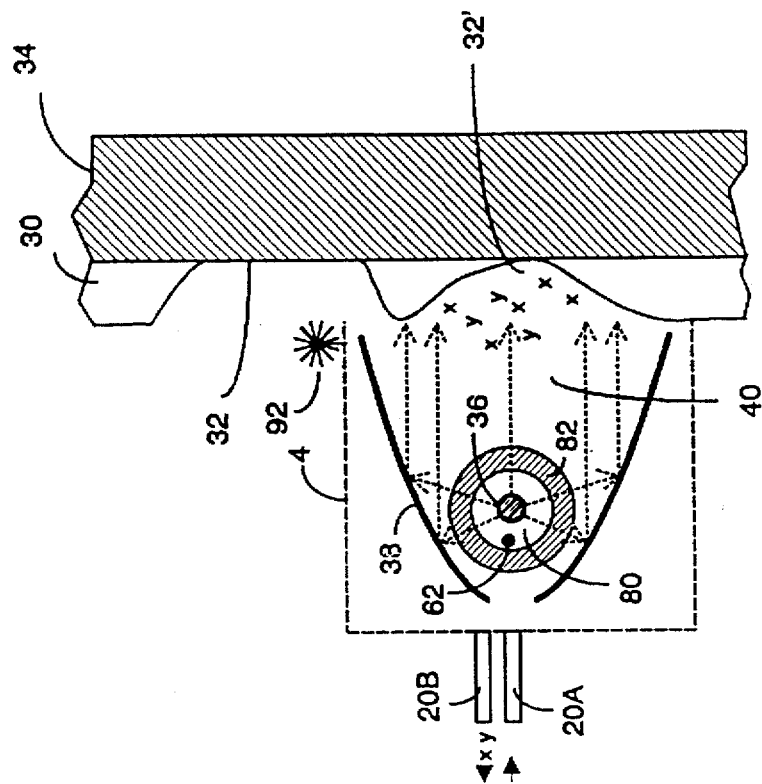
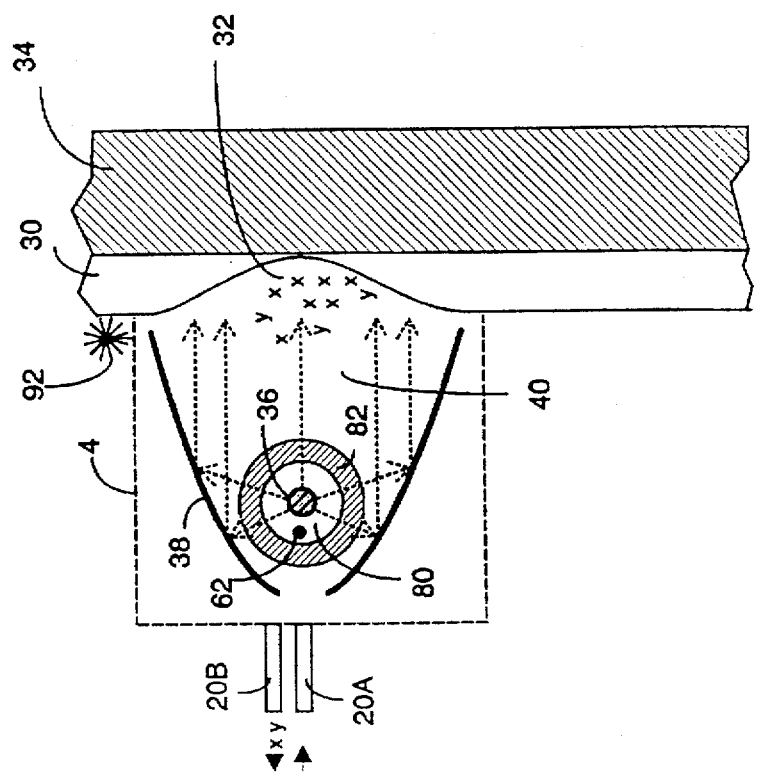
FIG. 4B
FIG. 4A

SYSTEM FOR PHOTOPYROLITICALLY REMOVING A CONTAMINANT

This is a division of application Ser. No. 08/378,944 filed 26 Jan. 1995, which was a continuation of application Ser. No. 08/067,521, filed 25 May 1993, now abandoned.

FIELD OF THE INVENTION

This invention relates to removal of a contaminant from a substrate surface, and more specifically to the safe disintegration and removal of a contaminant from a substrate surface using components of the light spectrum, without pre-coating the contaminant or substrate.

BACKGROUND OF THE INVENTION

The safe and efficient removal of contaminants from an underlying substrate surface can present a formidable challenge. Frequently the contaminants include materials that if not themselves hazardous, can become hazardous during a decontamination process. In addition, the decontamination process should not weaken or substantially damage the structural integrity of the underlying substrate. The design of a system for safely removing contaminants must concern itself with the potential exposure of removal personnel to hazards, cost of the system, the cost of any protective gear required to be worn by those using the system, the cost of the labor required for the decontamination process, and the cost of disposing of decontamination process byproducts.

As used herein, the term "contaminant" need not designate a material that is intrinsically harmful. For example, a coating such as paint, whose removal from an underlying substrate is desired, may be deemed a contaminant.

One commonly used prior art approach has been to blast the contaminants away with abrasive particles such as sand or plastic beads. While the equipment required to practice this approach is relatively inexpensive, this process is highly labor intensive, requiring protective masking of adjacent substrate regions and the wearing of protective garments by the work crew. During decontamination, considerable grit and/or particulate dust is present. This particulate matter often dictates that adjacent electrical generators and similar equipment be shutdown and protected, the downtime representing an additional economic burden imposed by abrasive decontamination systems.

In many applications, abrasive decontamination processes must be performed within an enclosed housing, which requires that the substrate be brought to the housing. This requirement can be burdensome where, for example, the substrate is large or cumbersome, the hull of a seagoing vessel, for example. Further, abrasive processes are slow, typically being on the order of less than one square foot per minute. Further, the structural integrity of the substrate being decontaminated may be weakened due to dimpling or stretching from impact with the abrasive particles. Finally, after decontamination is complete, a considerable volume of contaminated grit, including for example water, $CO_2$, plastic media and the like, must be safely disposed of, thus imposing a burden on existing landfill resources.

A second commonly used prior art approach is the use of chemical agents to remove contaminants such as undesired paint, methylene chloride being a commonly used agent. Unfortunately chemical agent techniques are even more labor intensive than abrasive techniques, requiring extensive preparation and clean-up after stripping, requiring perhaps 250 man-hours to decontaminate the exterior of a commercial airliner. Further, the personnel performing the decontamination must be provided with costly and cumbersome protective full body suits and breathing apparatus. Finally, chemical decontamination process byproducts can include hundreds of gallons of contaminated water and often methylene chloride, for which the cost of safe disposal can be quite high. At present there are few options available with regard to a chemical stripping agent that is effective and safe. Methylene chloride, for example, is expected to be banned by the United States Environmental Protection Agency from future use due to its release of ozone-depleting chlorofluorocarbons ("CFCs").

A third prior art approach is the removal of contaminants using high intensity visible spectrum light energy. For example, as disclosed in U.S. Pat. No. 4,867,796 to Asmus, et al., the contaminant is first precoated with an energy absorbing medium, and then subjected to pulses of high intensity light energy. The medium absorbs the light energy, which is converted to heat causing the contaminant to decompose and/or be vaporized, thus removing the contaminant from the substrate. The heat generated by the short duration light energy pulses is localized at the contaminant surface and is safely dissipated by the accompanying contaminant vaporization without substantially affecting the substrate. Interestingly, it has long been held in the prior art that energy pulses exceeding about 20 Joule/$cm^2$ are undesirable as tending to unduly heat and stress, if not combust, the underlying substrate.

While Asmus-type systems are especially promising commercially, the need to precoat the substrate before decontamination is time consuming, costly, and potentially hazardous. For example, workers performing the decontamination process are exposed to potentially hazardous contaminants during precoating. Even if the contaminant being precoated is non-hazardous, the areas to be precoated may be difficult or dangerous to reach, a very high ceiling, for example. After decontamination the problem remains of how to safely dispose of hazardous contaminants once they have been removed from the substrate using light energy. Finally, the thermal energy associated with Asmus-type decontamination systems can cause even non-hazardous contaminants to breakdown into sub-components that are hazardous and require safe disposal.

To summarize, what is needed is an apparatus and method providing safe and efficient decontamination, without damaging the substrate and without requiring that the contaminant be precoated. Preferably the apparatus and method should result in the removed contaminant being reduced to constituents that are relatively non-hazardous, and should provide a mechanism for containing and removing such constituents from the work site. Further, safe and efficient decontamination should be provided without requiring personnel performing decontamination to wear expensive and cumbersome bodysuits and breathing apparatus. The present invention discloses such an apparatus and method.

SUMMARY OF THE PRESENT INVENTION

The present invention provides a photopyrolitic process and apparatus whereby one or more contaminants on a substrate surface is safely removed without having to first precoat the contaminants and without substantially damaging the underlying substrate. The contaminants that may be so removed can include PCBs and nuclear material, as well as coatings such as paint.

In a first aspect, the present invention provides a system that includes a light source including a flashlamp whose energy output spectrum includes visible and infrared components, and an energizer that powers and triggers the light source. The energizer is operator controlled such that the light source's average energy output power, energy pulse width, and energy repetition rate are varied to best remove a contaminant from a substrate. Preferably a mechanism is provided for selectively filtering the light source output to emphasize a chosen region of the output spectrum.

The thus tailored energy output spectrum is selected to be advantageously absorbed by the contaminant to be removed, thereby promoting efficient removal. For example, where the contaminant is paint, ultraviolet output energy is preferably suppressed by coating the flashtube with a doping agent such as cerium-oxide to restrict ultraviolet spectral components. The paint absorbs components from the remaining energy spectrum, whereupon decontamination proceeds photopyrolitically, without subjecting personnel to possibly dangerous ultraviolet exposure. By contrast, in a bio- remediation task, ultraviolet components are desirable.

Bursts of energy from the light source heat the contaminant sufficiently to remove it from the substrate without substantially heating the substrate. In contrast to the prior art, the levels of energy employed in the present invention exceed what has hitherto been regarded as an upper limit, beyond which the substrate would be stressed and otherwise harmed. The contaminant appears to carbonize directly, being reduced to ash apparently without entering a melt phase. This process appears to occur at a rate faster than the majority of the heat associated with the carbonized contaminant can transfer to the substrate, thus minimizing heat buildup on the substrate surface. No precoating of the contaminant is required.

The light source preferably is mounted within a lamp head that is surrounded by a vacuum. As the lamp head is moved across the substrate, target regions of contaminant become carbonized and the resultant ash and gas byproducts are simultaneously drawn away by the vacuum surrounding the lamp head for safe disposal.

The light source is preferably partially surrounded by a bifurcated aerodynamic reflector that focusses the pulsed energy output onto the target contaminant and also promotes light source cooling. The reflector configuration is aerodynamic in the sense that an associated cooling airstream blows decontamination byproducts away from the focal region of the light source, thus maintaining an effective high output light energy level. According to the present invention, the lamphead may be handheld for movement across the substrate. Alternatively, a robotic arm mechanism can hold and move the lamphead across the substrate for decontamination. This is especially advantageous where the lamphead dwell time on a given substrate area is relatively long, during vitrification, for example.

In a second aspect, a method of decontamination is disclosed. The method calls for subjecting the target contaminant to a high train of light pulses whose average energy level, pulse width and pulse repetition rate are selected to heat and carbonize the contaminant without substantially heating the underlying substrate. Preferably the light pulses include components in the visible light spectrum, in the ultraviolet light spectrum near infrared ("IR"), and the method permits favoring a desired spectral region to promote more efficient decontamination. Simultaneous with the contaminant heating, the method preferably vacuums away decontamination byproducts, which may then be filtered and safely disposed of. Other features and advantages of the invention will appear from the following description in which the preferred embodiments have been set forth in detail, in conjunction with the accompanying drawings.

BRIEF DESCRIPTION OF THE DRAWINGS

FIGS. 4A and 4B depict decontamination, according to the present invention.

DETAILED DESCRIPTION OF THE PREFERRED EMBODIMENT

Figure 1:
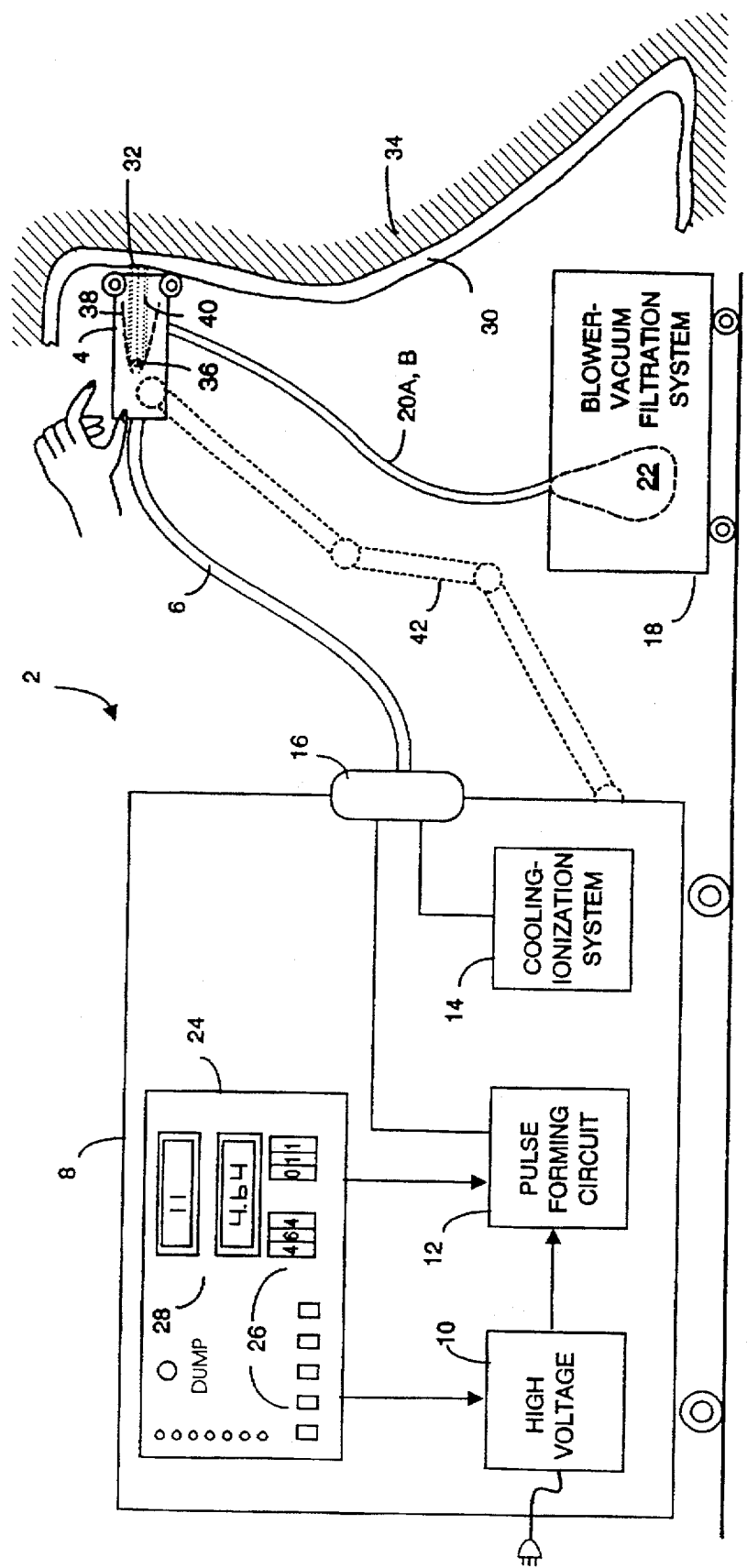
FIG. 1 depicts a system for safely removing a contaminant from a substrate surface, according to the present invention.

FIG. 1 depicts a system 2 according to the present invention as preferably including a handheld light source unit 4 that is coupled via an umbilical 6 to a portable console unit 8. Console unit 8 receives typically 220 VAC power from an external source and internally includes a high voltage power supply 10, a pulse forming circuit 12, and a cooling system 14. Preferably electrical signals and cooling water from these various elements are coupled to light source unit 4 via a Canon-type connector 16. Unit 18, shown generically in FIG. 1, provides pressurized air into light source unit 4 via hose 20A at about 150 ft$^3$/minute. Although it need not be located physically within unit 18, the present invention further includes a vacuum-generating mechanism that creates about 350 scfm (via hoses 20B) within light source unit 4. It will be appreciated that a negative net pressure thus is created within unit 4 that advantageously prevents decontamination byproducts from escaping. Preferably, unit 18 provides a filtration receptacle 22 into which hoses 20B deposit vacuum-removed byproducts resulting from decontamination of substrate 34. More specifically, soot, debris and other decontamination byproducts resulting from the operation of the present invention, are vacuum-removed from the area covered by the light source unit 4 via pressurized air return hoses 20B that lead into a suitable sealed receptacle 22 associated with system 18. Of course, receptacle 22 could be located external to system 18. Preferably a HEPA-compliant filter system and/ or carbon-activated filter is coupled in series with return hoses 20B, preferably near unit 4, to filter fine particulate matter. Further, the incoming pressurized air helps maintain a clean target region 32.

Console unit 8 further includes a control panel 24 having operator controls 26 and display readouts 28 for controlling the electrical power, and coolant from unit 8 via the umbilical 6 to the light source unit 4. Console unit 8 can also include controls governing operation of the external air/ filtration system 18. Preferably console unit 8 is mounted on wheels for mobility and is about the size of a standard relay rack, weighing perhaps 600 pounds. Of course other configurations could be used for console unit 8. The external air vacuum system 18 typically includes a compressor and is about the same size as console unit 8. Of course, if the decontamination work site includes a permanently installed shop vacuum and/or air compressor system, system 18 need not include an air compressor.

In brief, console unit 8 provides operator controllable electrical signals via umbilical 6 to the light source unit 4, which unit 4 is used to remove one or more contaminants 30 in a target area 32 from an underlying substrate 34. More particularly, light source unit 4 contains a flashlamp 36, partially surrounded by a bifurcated parabolic reflector 38, that emits energy 40. The energy 40 is reflected and/or focussed by the reflector 38, and removes one or more contaminants 30 from the target region 32, the decontamination byproducts preferably being removed via return hoses 20B for deposit in receptacle 22.

As used herein, target region 32 refers to the area of substrate 34 against which the light source unit 4 is positioned to remove contaminants 32 in that region. As depicted in FIG. 1, the substrate 34 may have any orientation and need not be planar. Further, contaminate(s) 30 need not have uniform thickness.

As an alternative to being handheld, unit 4 may be mounted on a robotic arm 42 that operates to mechanically move unit 4 across the substrate 34 and contaminants 30. Robotic movement of unit 4, preferably under programmed control of console 8, advantageously permits unit 4 to dwell over the same target area 32 sufficiently long to vitrify contaminants in certain applications.

Vitrification is the process of melting contaminants into glass using heat. Vitrification may be performed on soils and surfaces contaminated with hazardous wastes, such as polychlorinated biphenyls (PCBs), for remediation of a waste site. A concrete cooling water pool associated with a nuclear power plant can be such a site. By permitting a relatively long dwell time over a target area (e.g., at least many seconds), the hazardous waste is solidified and stabilized in glass form for subsequent disposal or recycling. Encapsulation in glass form essentially removes the environmental threat otherwise associated with the waste. By contrast, hazardous wastes that do not undergo vitrification can leach from their original point of disposal and pose a continuing environmental threat.

In the present invention, flashtube 36 can generate energy pulses in the 3,750 joule range, an energy level at which flashtubes in prior art configurations typically disintegrate. Generating this energy produces significant heat that must be safely dissipated to promote flashtube 36 longevity. It is therefore necessary to cool the flashlamp 36 with a circulating coolant, e.g., water, provided by cooling system 14.

Because photons from flashlamp 36 ionize the circulating coolant water, cooling system 14 preferably includes a deionizer (not shown) to ensure that the cooling water surrounding the flashlamp is non-conductive, e.g., deionized. The deionizer may, but need not be, mounted within console unit 8. In the preferred embodiment, system 16 circulates water via the deionizer around flashlamp 36. The water circulates with a flowrate of about 5 gallons/minutes and maintains a temperature around the flashlamp of about 68° F. (20° C.).

Figure 2:
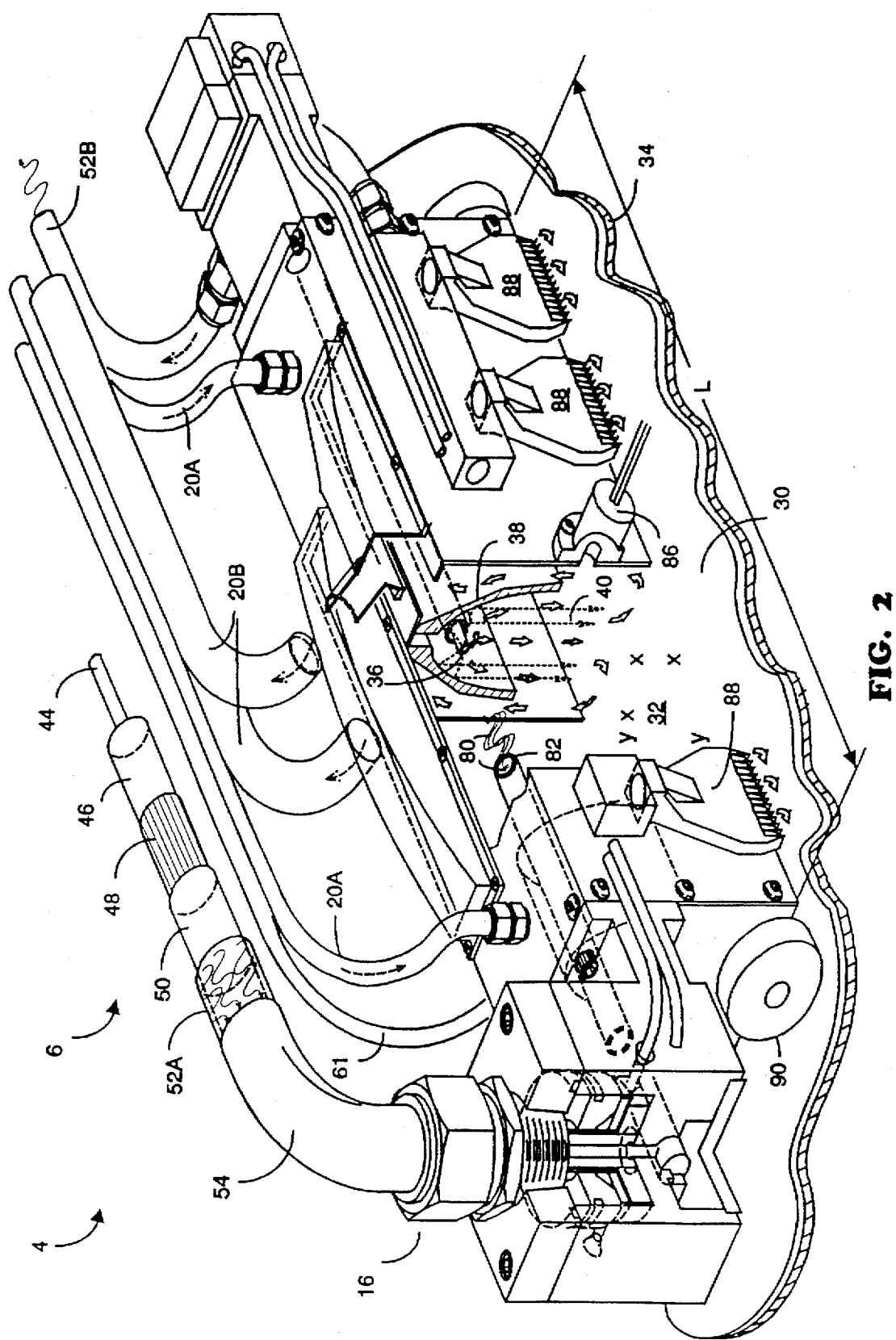
FIG. 2 is a simplified partial cutaway perspective view of a light source unit, according to the present invention.

With reference to FIG. 2, this de-ionizing cooling water preferably is provided within the reinforced tubing shell of umbilical 6, coaxially about an electrical conductor 44 carrying high voltage signals from the pulse forming circuit 12 to the light source unit 4, all within umbilical 6. Of course, the high voltage conductor 44 is surrounded by insulation 46, a ground braid 48, and a high voltage outer jacket 50, which elements are then surrounded by the de-ionizing cooling water 52A and the reinforced tubing shell 54 whose inner diameter is about 1.25" (3.2 cm). Other configurations for providing high voltage and input cooling water may be used, however. Heated, ionized, water from light source unit 4 is returned to system 14 for cooling and de-ionizing via a return conduit 52B.

With reference to FIG. 2, light source unit 4 preferably includes a xenon flashlamp 36 that operates somewhat similarly to a lamp used in flash photography, except that unit 4's light output energy is several thousand times more intense. The xenon gas is contained within a quartz envelope, the gas and envelope together forming flashlamp 36 in the accompanying figures. The outer diameter of the flashlamp 36, e.g., collectively the gas and surrounding quartz envelope is about 12 mm. A preferred unit for flashlamp 36 is model VBX F10 manufactured by V.B.I. Technology, Inc., located in Auburn, Calif.

For ease of use, light source unit 4 may be handheld and preferably measures about 9" (23 cm) in length by about 5" (12.7 cm) in depth by about 3" (7.6 Kg) width and weighs about thirteen pounds (5.9 Kg), although other configurations could of course be used. Different light source units 4 may be used, without requiring system modification, to provide lamp heads with a longitudinal arc length L varying from about 6" (15 cm) to about 24" (61 cm). Xenon gas within the flashlamp 36 absorbs pulses of electrical energy provided by the pulse forming circuit 12 via umbilical 6 and electrical lead 44. When the flashlamp receives these pulses, the xenon gas releases its stored energy in the form of light particles, or photons and heat, depicted as arrows 40.

The emitted light energy 40 will include visible, ultraviolet and infrared spectral components. Applicant believes that visible and infrared spectral components are associated with heating energy per se, whereas ultraviolet spectral components are associated with driving, or encouraging, chemical changes within the contaminant.

According to the present invention, controls 26 are operator adjusted such that power supply 10 and pulse forming circuit 12 cause light source unit 4 to be triggered, via umbilical 6, in a selected manner that causes flashlamp 36 to provide periodic pulse bursts of light energy having desired characteristics. If desired, similar controls could also be mounted on source unit 4. Such remote controls would be coupled via umbilical 6 to console 8 to permit remote operator control of the pulse forming parameters, without having to make adjustments at the console unit 8 itself.

The various controls permit decontamination personnel to vary, for example, the energy pulse width from about 400 μs to 800 μs (e.g., how long the light source will provide energy per each pulse), pulse repetition rate from about 0.1 to about 12 pulses/second, and the energy per pulse, from essentially zero to about 3,750 joules/pulse. This energy level is substantially higher than what the prior art regards to be safe with respect to heat damage to the substrate. Of course, other combinations of pulse widths, repetition rates and energy level/pulse could also be used.

It will be appreciated that the product of the number of pulses and the per unit pulse energy determines the rate of decontamination of a given substrate and contaminant. Large per unit energy pulses having a low repetition rate are generally preferred over the use of faster repetition rate pulses with less per unit energy since the former will accomplish the decontamination task sooner.

Figure 3A:
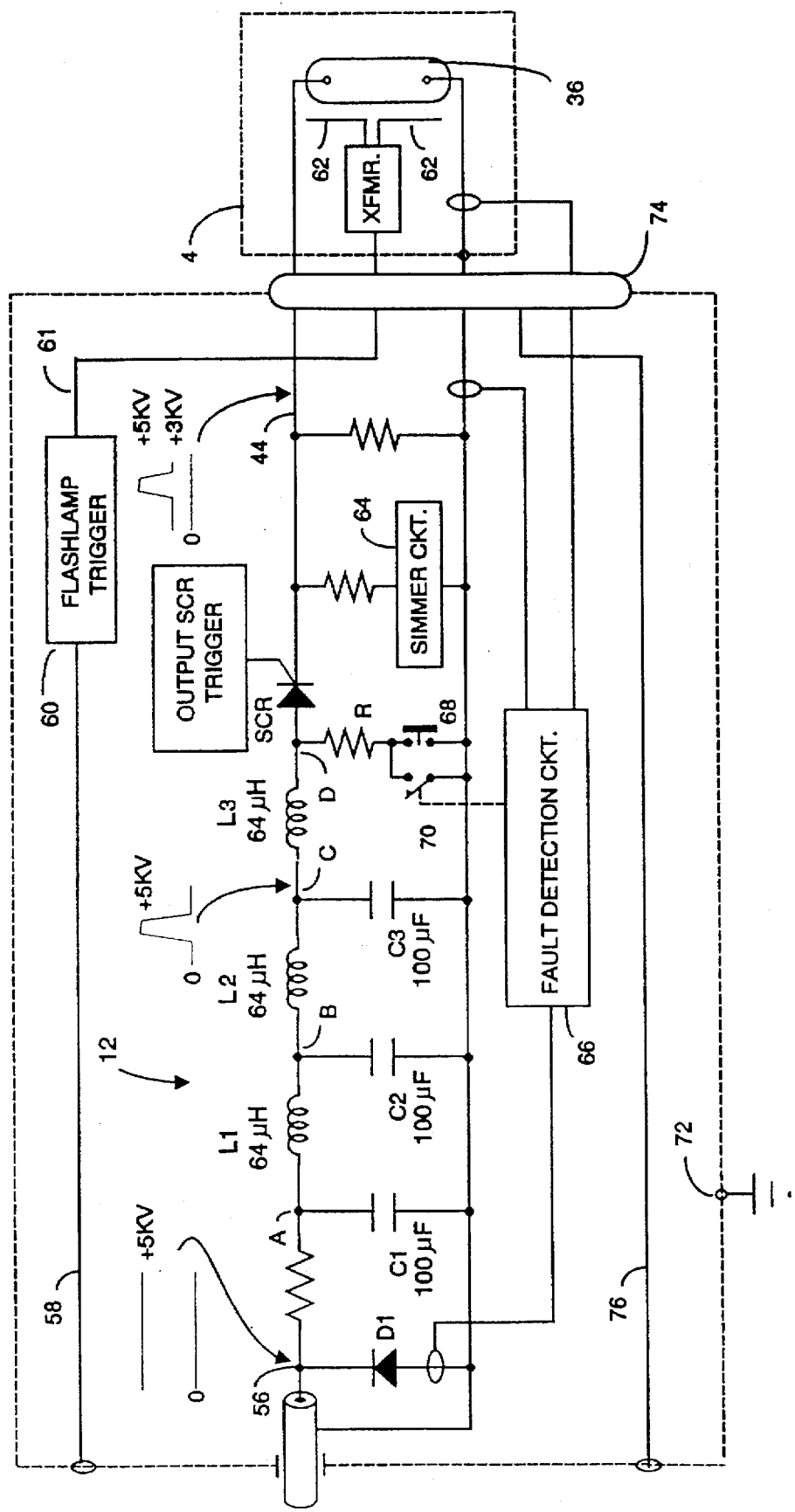
FIG. 3A is a generalized schematic of the electronics providing power to flashlamp 36 in light source unit 4, according to the present invention.
Figure 3B:
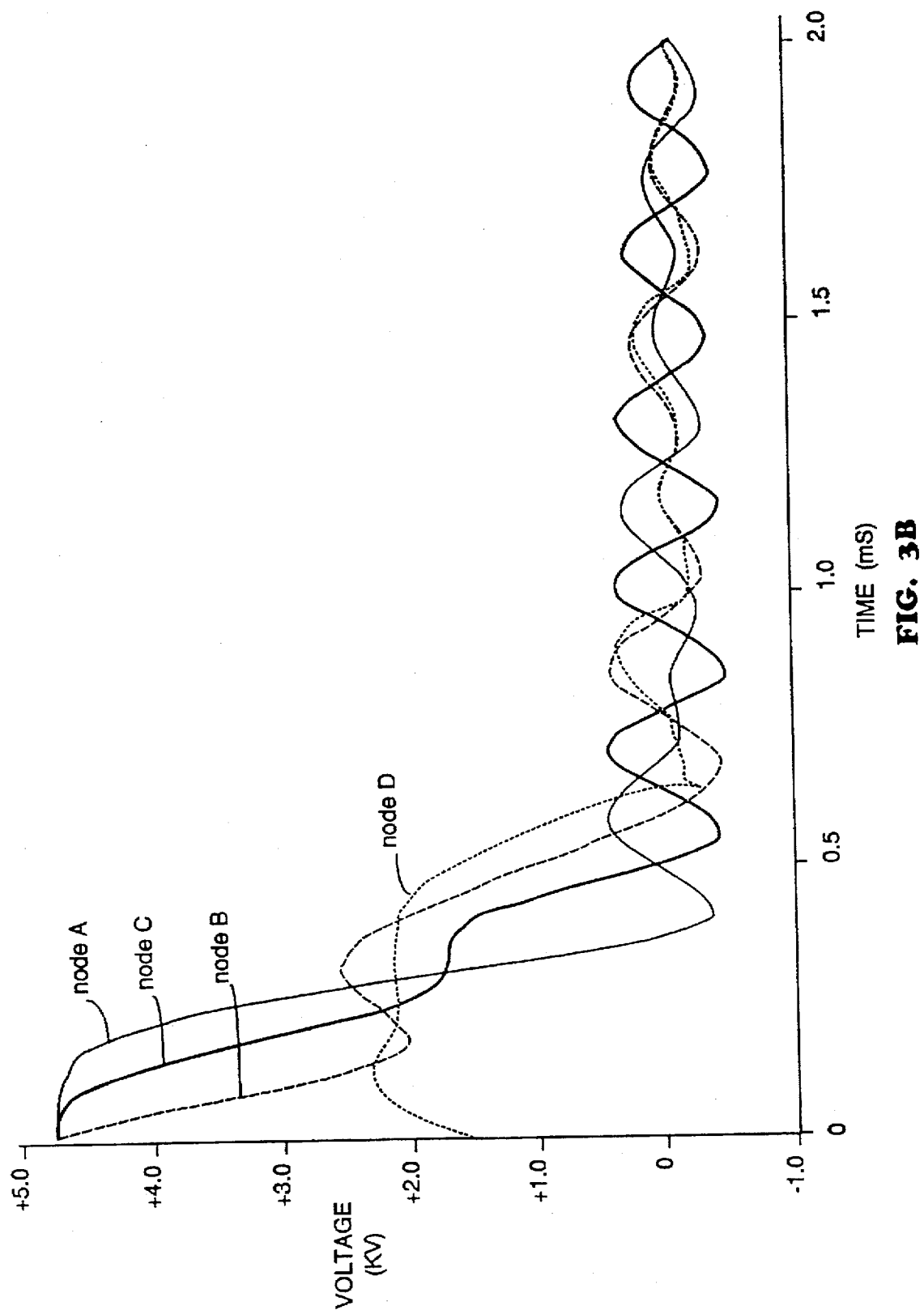
FIG. 3B depicts voltage waveforms at various nodes in a preferred embodiment of the pulse forming unit 12, shown in FIG. 3A.

FIG. 3A depicts a generalized schematic of the pulse forming circuit 12, and related circuitry for powering flash lamp 36 in unit 4, whereas FIG. 3B depicts voltage versus time waveforms at various nodes in the schematic of FIG. 3A. The input voltage to the circuitry of FIG. 3A is provided by power supply 10, which preferably operates from three-phase 220 VAC. Nominally, power supply 10 provides an output rated at 40 kW, 5 kV peak output. Further, step-up or step-down transformers may also be utilized to accommodate the power at hand. Of course in remote locations where 220 VAC is not available, an electrical generator of perhaps 5 to 10 horsepower could be used to provide input power for power supply 10.

Power supply 10 is preferably implemented using resonant inverter switching power supplies using insulated gate bipolar transistors ("IGBTs"). Preferably one such inverter is operated as a master power supply module, with two additional inverters being slaved to the master module. Collectively, power supply 10 provides a peak 5 kV DC output with a rating of about 45,000 Joules/second, and supports operation of flashtube 36 at 12 pulses/second or more. Because the design of power supply 10 will be known to those skilled in the art, detailed schematics are not here provided.

With reference to FIG. 3A, the nominal 5 kV output from power supply unit 10 is coupled via lead 46 to the pulse forming network unit 12. As shown therein, unit 12 includes pulse shaping capacitors C1–C3 and inductors L1–L3, formed in a three section pi-network. In the preferred embodiment, capacitors C1–C3 are each about 100 μF and inductors L1–L3 are each about 64 μH.

FIG. 3B shows the voltage waveforms present at nodes A, B, C and D in FIG. 5A. As shown therein, the peak capacitor voltages at nodes A, B, C are about 5 kV nominal, which provides an energy storage of about 3,750 Joules per pulse of flashtube 36. The baseline of the waveforms for nodes A, B and C indicates minimal reverse voltage on capacitors C1–C3.

The output of pulse shaping unit 12 is switched into the light source unit 4 via three series-coupled silicon controlled rectifiers (depicted collectively as "SCR" in FIG. 3A), which are transformer driven from a single field effect transistor. The present embodiment uses 20 kV rated TR2012 SCRs, manufactured by the EG&G Company, located in Salem, Mass. The pulse shaping unit output is coupled via lead 44 to the input of flashlamp 36, and attains about 2.4 kV with a peak current of about 3.13 kA at 120 μs. This peak current corresponds to $i \approx CdV/dt$, where $C=100$ μF, $dV \approx 2$ kV and $dt \approx 100$ μs. At about 12 Hz repetition rate, the output waveform represents about 204 A RMS.

When the present invention is first turned on, for example at the start of the work day, an initial power-up signal is provided by console unit 8. As shown by FIG. 3A, this signal is coupled via lead 58 to a flashlamp trigger circuit 60 that provides a high voltage, short duration lamp trigger pulse to initiate conduction of flashlamp 36. This signal is coupled via lead 61 to unit 4 and conventional circuitry within the flashlamp trigger 60 and, at power-on, provides a typically 30 kV, 1.5 μs full width half measure ("FWHM") pulse to flashlamp 36 to initiate conduction. Within unit 4, an SCR and step-up pulse auto-transformer couple this start-up pulse to an external electrode 62 disposed axially along side flashlamp 36.

As noted, flashlamp trigger 60 initiates conduction of flashlamp 36, but thereafter pulses coupled via lead 44 fire flashtube 36, under operator or console unit 8 control. However to minimize stress on flashtube 36, the pulse forming circuit 12 preferably includes a simmer circuit 64 that maintains a continuous conductive flashlamp state. Simmer circuit 64 is preferably current regulated and provides a nominal no-load 3 kV and a 1 A trigger current to the flashlamp 36. Thus, as shown in FIG. 3A, the voltage waveform at lead 44 is nominally about 3 kV with a peak voltage of 5 kV. The width of the 5 kV pulse determines the width of the energy pulse provided by flashlamp 36, and the repetition rate of the 5 kV pulse determines the repetition rate of the flashtube. Because the design of simmer circuitry is known to those skilled in the art, further details are not provided here.

To promote operator safety, a fault detection circuit 66 includes a simmer current threshold interlock that inhibits charging the pulse forming network 12 when the flashlamp simmer current falls below an internally adjustable level.

Understandably, because lethal power levels are employed, the present invention includes various safety features to protect operating personnel. For example a manual crowbar 68 comprising a shorting stick and a dump resistor R permit absorbing of the full energy of the pulse shaping capacitors C1–C3 three successive times, should immediate shutdown of system 2 be required.

Further, a pair of automatic crowbars 70 coupled to fault detection circuitry 66, automatically shuts down the system under fault conditions. Crowbars 70 preferably comprise a ROSS Engineering high voltage relay and associated dump resistor.

Those skilled in the art will appreciate that good pulsed-power practice requires minimum discharge loop areas, single point grounding and adequate filtering of incoming power and signal lines. Because the present invention is implemented with a single point ground node 72, the only current normally flowing through this node would be displacement current from stray capacitive and inductive coupling, occurring during a pulse discharge. Thus, a current monitor within circuitry 66 monitors current flow through node 72, and in the event of a flow greater than a desired threshold, the automatic crowbar 70 will shutdown system 2 until reset. Further, circuitry 66 also detects excessive output current and terminates pulse generation by unit 12 to safeguard system 2. As depicted in FIG. 3A, ground as well as the other electrical connections preferably are made to unit 4 via a connector 74. Line 76 in FIG. 3A couples control signals between unit 4 and a controller within console unit 8.

It will be apparent from these figures that system 2 includes a mechanism for grounding light source unit 4 and returning discharged electrical currents from flashlamp 36 to the console unit 8 and power supply unit 10. In addition to promoting safety, the present invention advantageously reduces the generation of unwanted electromagnetic interference radiation ("EMI") and radio frequency interference radiation ("RFI") by using a single point grounding mechanism and by using coaxial connections to the flashlamp electrodes.

When system 2 is properly adjusted by the decontamination personnel, bursts of energy 40 from flashlamp 36 appear to be at least partially absorbed by contaminant(s) 30 in the target area 32, and are converted into heat. Proper system adjustment entails adjusting the energy pulse width and/or repetition rate, average energy level, and preferably optimizing the spectral output of the emitted light energy for the contaminants at hand.

When properly adjusted, emitted energy at the contaminant can reach 2,000° C. or so, albeit for an extremely short time period. These short burst of intense heat appear to transform the contaminant from a solid phase to a combination of gases and typically whitish ash, without entering a melt phase. As such, the contaminant molecules appear to absorb components of the light source energy spectra directly and carbonize (e.g., decompose or reduce to ash), without the need for precoating with an absorbing agent, as disclosed in the Asmus, et al. patent.

The heat produced by applicant's photopyrolitic system is believed to decompose even hazardous contaminants into lower molecular weight molecules. The ash byproduct in applicant's method is usually, but not always, whitish in color, with substantially no smoke being present. By contrast, a blackish ash and smoke byproduct are believed indicative of partial decomposition, probably due to incomplete degradation accompanied by a chemical reaction from overheating the contaminant.

Molecular decomposition occurs relatively faster than the accompanying heat can transfer from the contaminant to the substrate. Stated differently, the rate of contaminant decomposition (that is, reduction to a lower molecular weight) occurs at a faster rate than heat can be conducted to the next exposed layer of decontaminated substrate. Thus, the substrate undergoes minimal heating or thermal loading, with essentially no adverse effect upon the substrate structural integrity. For example, it appears that while the contaminant temperature in target region 32 can briefly reach 2,000° C. or so, the underlying substrate temperature only increases about 17° C. to 28° C. In this fashion, while the present invention employs energy levels substantially higher than what has been believed safe in the prior art, decontamination proceeds efficiently without apparent heat damage to the underlying substrate.

With further reference to FIG. 2, when the flashtube 36 is triggered, the emitted light energy 40 is focussed by reflector 38 upon target region 32. Reflector 38 is mounted upstream of flashlamp 36, and has preferably a truncated bifurcated aerodynamic shape. In the preferred embodiment, reflector 38 defines a truncated ellipse, although other configurations are possible, the goal being to focus emitted light energy upon the target region of the substrate.

In the preferred embodiment, pressurized air from system 18 is caused to flow through the bifurcation region of the reflector 38 as noted by the "hollow" arrows in FIG. 2. This airstream helps cool the flashtube 36, and also maintains the target region 32 relatively free of ash and debris (shown as x in FIG. 2) and other byproducts (shown as y). The resultant airflow within unit 4 essentially vacuum-removes x and y, which leave unit 4 via outlet hose 20B to be deposited into receptacle 22 in system 18 (see FIG. 1). Because x and y are thus removed, flashtube 36 can deliver output energy 40 to the target region 32, relatively unimpaired by any intervening ash and debris.

The pressurized air is preferably also provided to several wind jets 88 located on the perimeter of light source unit 4. These jets deliver an airstream downward and toward the target area 32, to ensure that debris, gases, and other byproducts do not escape from unit 4. As such, jets 88 promote the safe removal of these byproducts from unit 4, via hoses 20B, for safe deposit in receptacle 22. Because of the air turbulence advantageously created within unit 4, it suffices to mount jets 88 on the "front" side of unit 4, e.g., the side facing the direction towards which the unit is being moved. Of course jets 88 could be mounted on the "back" side as well.

Reflector 38 has a highly polished silver coated reflecting surface. This surface is preferably produced using the so-called Raytheon twenty-two step process wherein the machined reflector surface is first polished and treated to ensure good adhesion of the subsequent plating. Next, a layer of copper is applied, then a layer of nickel, a layer of silver and then a protective coating. Reflectors made according to this process are made by the Kentek Company, located in Pittsfield, N.H..

While applicant has also used a polished aluminum reflector, a silver plated surface provides superior performance due to its increased reflectivity. In side cross-section, the front-to-back dimension of the reflector is about 3.5" (8.9 cm), with the axis of the flashtube being located at the focal point, about 1.5" (3.8 cm) from the rear region of the reflector surface. See for example FIGS. 4A and 4B.

Effective decontamination is a function of the characteristics and magnitude of the light energy 40 provided by flashlamp 36 to the target region 32, including the energy wavelengths. The wavelength of the emitted light energy 40 depends upon several factors including, without limitation, the flashlamp gas used (e.g., xenon), the pressure within the flashlamp, and the composition of the material in reflector 38 (preferably a highly polished silver coating). However light energy 40's spectral components may also be operator controlled somewhat for the decontamination task at hand by varying the pulse characteristics and operating potential provided by control unit 8.

To promote a desired distribution of visible and ultraviolet radiation, the flashlamp 36 is preferably mounted within a doped outer quartz envelope member 82 (see FIGS. 4A and 4B) whose shape is a longitudinal cylinder. In the preferred embodiment, member 82 has an outer diameter of about 22 mm, an inner diameter of about 18 mm, and a longitudinal length approximating the length L of the flashlamp 36. Outer member 82 is preferably clear fused quartz or Suprasil, a synthetic quartz material that includes a material commonly known as sprasil that was doped with cerium-oxide during fabrication. V.B.I., Inc. of Auburn, Calif. is a manufacturer of units suitable for use as member 66 in the present invention.

As shown by FIGS. 4A and 4B, the cooling deionized water 80 circulated by system 14 via conduits 52A and 52B circulates in the cylindrical space between the exterior surface of flashlamp 36 and the interior surface of the outer quartz member 82. Although electrode element 62 is depicted in FIGS. 4A and 4B mounted longitudinally immediately opposite the bifurcation region of reflector 18, element 62 may be longitudinally mounted in a different position, preferably close to the exterior surface of outer quartz member 82.

Preferably member 82 is readily removed from the lamp unit 4 for replacement by a second member 82' (not shown) having a second set of characteristics resulting in a different distribution of ultraviolet, visible and infrared radiation 40. In the preferred embodiment, an operator can modify light source unit 4, going from a Suprasil to an undoped quartz member 66 in about five minutes. Further, a different lamp unit having a different arc length L may also be readily substituted.

By experimentally filtering out ultraviolet components from the flashlamp output spectrum, applicants discovered that certain contaminants or coatings still decompose as fast if not faster than when ultraviolet components are present. By filtering out ultraviolet components, decontamination still occurs, with the advantage that work personnel are not subjected to potentially harmful ultraviolet radiation. That decontamination can occur in many applications without the requirement for significant ultraviolet energy components is a departure from what has been practiced in the prior art.

Table I below briefly summarizes these findings, where the first three columns denote what spectra components were present, and the four column indicates whether decontamination was successful. Apparently visible spectrum components promote a more complete combustion, wherein there is essentially no smoke, a white ash, and little chemical reaction. By contrast, black ash and smoke byproducts seem to reflect partial decomposition, probably due to an incomplete ultraviolet degradation resulting in a chemical reaction that may or may not complete.

TABLE I

| ultraviolet | visible | infrared | removal |
|---|---|---|---|
| yes | yes | no | no |
| no | yes | yes | yes |
| yes | yes | yes | yes |
| yes | no | yes | no |

Alternatively, members 82, 82' may be undoped but of varying grades of quartz to provide a spectrum filtering function. For example, commercially available T08 non-doped quartz has a transmission range from about 210 nm (ultraviolet) through visible and infrared regions up to 3.7 μm, with absorption bands at about 240 nm (ultraviolet) and 2.72 μm (infrared).

The ability to readily exchange member 82 permits further flexibility in tailoring system 2's ability to safely and efficiently remove different types of contaminants. Light source unit 4 preferably includes various safety interlocks (not shown) to prevent personnel from receiving electrical shock while replacing member 82 or the flashlamp 36. Further, the present invention also provides a "deadman"-type switch (not shown) to deactivate flashlamp 36 when unit 4 is not held or otherwise in a working disposition.

Further, the flashtube 36 may itself may be cerium-oxide coated to provide a desired spectrum filtering function. Commercially available M-382 cerium-oxide doped fused quartz envelopes attenuate ultraviolet below about 400 nm.

Typically the nature of the coatings of contaminant to be removed will suggest what output spectrum energy should be used. For example, paint or contaminants containing epoxy or polyurethane react favorably to flashtube energy that includes ultraviolet components, components not filtered by quartz. However, according to the present invention a cerium-oxide doped flashtube appears to remove such contaminants, without substantial ultraviolet energy components, as well as would a quartz-filtered flashtube that emitted ultraviolet energy. Understandably, the present invention's ability to rapidly and safely remove such contaminants without the health hazard associated with ultraviolet energy will be appreciated by those skilled in the art.

Experienced personnel using the present invention can tell from the noise level accompanying removal, from the color of the soot, and from the relative speed of the removal process whether system parameters have been well optimized for the removal task at hand. The energy output provided by the lamp unit may be varied via controls on console 8 to alter the output energy spectrum. For example, decreasing the output energy say 100% to perhaps 80% will shift the output spectrum from substantially visible light components toward the near infrared region.

The noise or sound level present at light source unit 4 is preferably monitored with a sound detector unit 86 (see FIG. 2), whose output is preferably coupled to console unit 8. The level and characteristic of the monitored sound provides an indication of the effectiveness and rate of removal of contaminants. For example, when system 2 is providing energy pulses of a suitable pulse width, repetition rate, energy level and spectral content the detected sound will be different than when the various system adjustments are less correct. Similarly, if the system is optimized for removal of a certain type of contaminant and a different contaminant is suddenly encountered, there can be a discernable change in the detected noise level and/or characteristics.

A less dense, more easily removed, contaminant may be characterized by a higher noise level. Thus, detecting the noise level at the light source unit 4 and feeding this information to the console unit 8 to vary, for example, the trigger characteristics can provide a closed loop feedback system to optimize system parameters for efficient decontamination. Alternatively, the system could be operated open loop, with the system operator examining the detected noise or frequency (on a meter or spectrum analyzer, for example) to manually vary system parameters to optimize decontamination.

In contrast to prior art decontamination methods, personnel operating system 2 need not routinely wear protective body suits and/or special breathing apparatus. In applications where ultraviolet spectral energy is required, ultraviolet goggles should, however, be worn for eye protection against light energy from unit 4.

FIG. 4A shows the beginning of decontamination according to the present invention, with unit 4 positioned over a desired target area 32 containing contaminant(s) 30. Flashlamp 36 is emitting light energy 40 which, according to the present invention, has carbonized the contaminant(s) in the target area, reducing the contaminant(s) to a typically whitish ash debris (depicted as "x") and gaseous and other byproducts (depicted as "y").

The ash and byproducts x, y are essentially simultaneously withdrawn from the target area 32 and from the lamp unit 4 via conduits 20B as a result of the vacuum created by system 18. The ash and other byproducts are deposited into receptacle 22 for safe disposal. Although as shown in FIG. 4A, there is ash x present in the target region 32, the air pressure and flow through and about the bifurcated reflector 38 maintains a relatively clear path for energy 40 from flashtube 36, as has been described. In addition, air flow from jets 88 on the exterior of unit 4 create an air flow tending to block escape of particles x or gas y from within unit 4. The "hollow" arrows in FIG. 2 depict the nature of the air flow within and without unit 4.

In FIG. 4B, the operator (not shown) or the robotic arm 42 has moved unit 4 downward to a new target region 32', leaving behind former target region 32, now in a decontaminated condition, with contaminant(s) 30 removed from the surface of substrate 34. Thus, as one target region 32 is decontaminated, unit 4 is moved to a different substrate region 32' for decontamination. Wheels or coasting glide surfaces 90 (see FIG. 2) 90, promote movement of unit 4 across work area. FIGS. 4A and 4B also show optional rotating wire or horse-hair brushes 92 that may be incorporated into unit 4 to frictionally remove any residual from the surface of substrate 34. Thus, as one substrate region is carbonized, the resultant ash and byproducts x, y are vacuumed away for safe deposal within receptacle 22. As unit 4 is moved onto a new area 32' for decontamination, the former target area 32 is left in a substantially decontaminated condition.

A brief description of what applicant believes to be the process by which even hazardous contaminants, for example polychlorinated bi-phenyl (or "PCB"), are reduced by the present invention to less hazardous sub-components will now be given. The present invention can heat a PCB-contaminated substrate to about 980° C., whereas PCBs degrade at about 276° C. When used to treat a PCB-contaminated substrate, which may in fact be soil or even oil, applicant believes that the present invention probably causes the bi-phenyls to break from the chlorine. The byproducts are vacuum removed, using the present invention.

After decontaminating PCB-containing soil or oil, the byproducts could be further processed by the addition of calcium carbonate. The resultant chlorine molecule would then probably bond with the calcium carbonate, producing small amounts of carbon dioxide and possibly hydrochloric acid as by-products.

Thus, the present invention provides safe and relatively fast decontamination without generating copious amounts of contaminated liquid or solid debris, and without imposing undue burdens on existing landfills. Further, even dangerous contaminants are safely broken down into sub-components that are reduced to a fine ash and may be readily disposed of in a safe manner. If desired, after decontamination the substrate surface 34 may be bombarded with meltable $CO_2$ pellets, rinsed with water, or wiped with a rag.

Modifications and variations may be made to the disclosed embodiments without departing from the subject and spirit of the invention as defined by the following claims.

What is claimed is:

1. A system for removing a contaminant from a substrate, comprising:
   light energy means for directly heating the contaminant, said light energy means having an output spectrum including an infrared component and a visible component; and
   energizing means, coupled to said light energy means, for causing said light energy means to provide to the contaminant at least one pulse of light energy having a desired characteristic;
   wherein energy from said light energy means carbonizes the contaminant relatively faster than said energy heats said substrate, thereby removing said contaminate from said substrate.

2. The system of claim 1, wherein said light energy means includes a xenon flash lamp.

3. The system of claim 1, wherein said desired characteristic includes at least one characteristic selected from the group consisting of an energy pulse repetition rate of between about 0.1 pulse/second and 12 pulse/second, an energy pulse duration of about 400 µs to about 800 µs, and a peak energy per pulse exceeding about 3,700 Joule.

4. The system of claim 2, further including means for selectively emphasizing a desired output spectrum from said light energy means.

5. The system of claim 4, wherein said means for selectively emphasizing includes at least one characteristic selected from the group consisting of:
   (a) said means includes a clear fused doped quartz member surrounding said flashlamp;
   (b) said means includes a clear fused doped quartz member surrounding said flashlamp, wherein said member includes a Suprasil material doped with cerium-oxide; and
   (c) said means includes modulating said energizing means.

6. The system of claim 1, wherein said light energy means further includes a reflector disposed upstream of said flashlamp, for focussing said light energy upon the contaminant.

7. The system of claim 6, wherein said reflector includes at least one characteristic selected from the group consisting of:
   (a) said reflector is bifurcated;
   (b) said reflector includes a polished silver plated surface facing said flashlamp, and (c) said reflector defines a truncated ellipse in cross-section.

8. The system of claim 6, wherein:
   said reflector is bifurcated, and
   said system further includes means for delivering a pressurized gas to said light energy means via a bifurcated region of said reflector, for maintaining a downstream region within said light energy means substantially free of a decontamination byproduct.

9. The system of claim 8, wherein said means for delivering further causes vacuum removal of decontamination byproducts away from said substrate and from said light energy means.

10. The system of claim 1, wherein said energizing means includes a pulse forming circuit that is adjustable to vary at least one characteristic selected from the group consisting of:
    (a) an energy pulse repetition rate of between about 0.1 pulse/second and 12 pulses/second;
    (b) an energy pulse duration of about 400 µs to about 800 µs; and
    (c) an energy per pulse exceeding about 3,700 Joule.

11. The system of claim 1, further including cooling means for cooling said light source unit, said cooling means circulating a coolant provided coaxially to said light source unit with an electrical lead coupling said energizing means to said light source unit.

12. The system of claim 1, further including robotic arm movement means for moving said light source unit over said substrate sufficiently slowly to vitrify a contaminant on said substrate.

13. The system of claim 1, further including feedback means for monitoring effectiveness of decontamination and for adjusting at least one parameter of said system to promote more effective decontamination.

14. The system of claim 13, wherein said feedback means includes a detector disposed adjacent said light energy means;
    wherein said detector detects at least one characteristic selected from the group consisting of sound and frequency to provide an indication of level of decontamination effectiveness.

15. The system of claim 1, wherein said system decomposes said contaminant to a lower molecular weight.

* * * * *